United States Patent
Büttner et al.

(10) Patent No.: US 11,341,395 B2
(45) Date of Patent: May 24, 2022

(54) DEVICE AND METHOD FOR DETERMINING THE STATUS OF A SPINDLE OF A MACHINE TOOL

(71) Applicant: Siemens Aktiengesellschaft, Munich (DE)

(72) Inventors: Florian Büttner, Munich (DE); Felix Buggenthin, Munich (DE); Felix Butz, Schweinfurt (DE); Georg Domaschke, Seifhennersdorf (DE); Michael Helbig, Ebern (DE); Philipp Siegel, Zwickau (DE); Werner Vom Eyser, Ebersberg (DE)

(73) Assignee: Siemens Aktiengesellschaft, Munich (DE)

( * ) Notice: Subject to any disclaimer, the term of this patent is extended or adjusted under 35 U.S.C. 154(b) by 10 days.

(21) Appl. No.: 16/628,520

(22) PCT Filed: Jun. 29, 2018

(86) PCT No.: PCT/EP2018/067525
§ 371 (c)(1),
(2) Date: Jan. 3, 2020

(87) PCT Pub. No.: WO2019/007820
PCT Pub. Date: Jan. 10, 2019

(65) Prior Publication Data
US 2020/0160152 A1 May 21, 2020

(30) Foreign Application Priority Data
Jul. 4, 2017 (EP) .................................. 17179597

(51) Int. Cl.
*G06N 3/04* (2006.01)
*B23Q 5/10* (2006.01)

(52) U.S. Cl.
CPC ............. *G06N 3/0454* (2013.01); *B23Q 5/10* (2013.01); *G05B 2219/37226* (2013.01); *G05B 2219/37343* (2013.01); *G05B 2219/37525* (2013.01)

(58) Field of Classification Search
None
See application file for complete search history.

(56) References Cited

U.S. PATENT DOCUMENTS

| 4,617,635 A * | 10/1986 | Shimizu | G05B 19/4163 318/571 |
| 5,566,092 A | 10/1996 | Wang et al. | |

(Continued)

FOREIGN PATENT DOCUMENTS

CN 102825504 B 12/2014

OTHER PUBLICATIONS

Drouillet et al.; "Tool life predictions in milling using spindle power with the neural network technique"; Apr. 2016; Journal of Manufacturing Processes; vol. 22; pp. 161-168. (Year: 2016).*

(Continued)

*Primary Examiner* — Umut Onat
(74) *Attorney, Agent, or Firm* — Henry M. Feiereisen LLC

(57) ABSTRACT

A device for determining a spindle status of a spindle of a machine tool includes a detector for detecting sensor data of the spindle for a defined time window. A processing unit analyses the sensor data through artificial intelligence by calculating a defined feature of the sensor data for the defined time window and determining a spindle status from the sensor data. An output member outputs the determined spindle status.

14 Claims, 1 Drawing Sheet

(56) References Cited

U.S. PATENT DOCUMENTS

| | | | | |
|---|---|---|---|---|
| 5,568,028 | A * | 10/1996 | Uchiyama | G05B 19/4065 318/433 |
| 8,451,255 | B2 * | 5/2013 | Weber | G06F 3/016 345/179 |
| 8,608,924 | B2 * | 12/2013 | Cooper | A61B 5/14532 204/406 |
| 9,581,989 | B2 * | 2/2017 | Li | G05B 19/00 |
| 10,452,052 | B2 * | 10/2019 | Rogers | G05B 19/4097 |
| 10,766,151 | B2 * | 9/2020 | Kuno | G01L 3/00 |
| 2011/0279380 | A1 * | 11/2011 | Weber | G06F 3/016 345/173 |
| 2012/0088996 | A1 * | 4/2012 | Cooper | A61B 5/6849 600/345 |
| 2014/0298099 | A1 | 10/2014 | Tan et al. | |
| 2017/0351817 | A1 * | 12/2017 | Bernstein | A61B 5/1473 |
| 2019/0204820 | A1 * | 7/2019 | Andrassy | G05B 23/0275 |

OTHER PUBLICATIONS

Hsieh et al.; "Application of backpropagation neural network for spindle vibration-based tool wear monitoring in micro-milling"; Oct. 26, 2011; Springer-Verlag; pp. 53-61 (Year: 2011).*

PCT International Search Report and Written Opinion of International Searching Authority dated Oct. 12, 2018. corresponding to PCT International Application No. PCT/EP2018/067525 filed Jun. 29, 2018.

\* cited by examiner

//.# DEVICE AND METHOD FOR DETERMINING THE STATUS OF A SPINDLE OF A MACHINE TOOL

CROSS-REFERENCES TO RELATED APPLICATIONS

This application is the U.S. National Stage of International Application No. PCT/EP2018/067525, filed Jun. 29, 2018, which designated the United States and has been published as International Publication No. WO 2019/007820 A1 and which claims the priority of European Patent Application, Serial No. 17179597.4, filed Jul. 4, 2017, pursuant to 35 U.S.C. 119(a)-(d).

BACKGROUND OF THE INVENTION

The invention relates to a device for determining a spindle status of a spindle of a machine tool and to a method of this type.

During operation of a spindle of a machine tool, also referred to as tool spindle, unexpected errors can occur for various reasons. For instance, it is possible for the spindle, when it runs at an increased load level over a longer period of time, to fail at an early stage and thus before the end of its actual service life. Current systems have no interface which allows data describing a current spindle status to be displayed. A current load of the spindle or an increased risk of error can therefore not be determined by means of an objective measurement.

At present the spindle status is estimated on the basis of experiences of an operator of the machine tool.

The object underlying the invention is to improve a machine tool of this type.

SUMMARY OF THE INVENTION

The object is achieved, by a device, for determining a spindle status of a spindle of a machine tool, with a detecting means, which is used to detect sensor data of the spindle, a processing unit, which is embodied such that it analyzes the detected sensor data using artificial intelligence and herefrom determines a spindle status, and an output means for outputting the determined spindle status.

Further advantageous embodiments of the invention are contained in subclaims.

Moreover, the object is achieved by a method for determining a spindle status with a device as as set forth above, having the following steps:
detecting the sensor data of the spindle using the detecting means,
analyzing the detected sensor data using the processing unit by means of artificial intelligence,
determining a spindle status on the basis of the analysis of the detected sensor data,
outputting the determined spindle status using the output means.

Further advantageous embodiments of the invention can be found in dependent claims.

The inventive device for determining a spindle status of a spindle of a machine tool preferably characterizes a load of the spindle. Advantageously, for this purpose the detecting means senses, during operation of the machine tool, sensor data of the spindle such as, for instance, the temperature of the spindle, the torque of the spindle, the force of the spindle and/or the rotational speed of the spindle. In particular, all afore-cited sensor data is detected by the device. The afore-cited sensor data can be used by the device to ascertain a spindle status.

The processing unit analyzes the detected sensor data using artificial intelligence and determines a spindle status herefrom. Advantageously the processing unit categorizes the load of the spindle, preferably into at least four categories. A division into one of the four following categories is particularly suited hereto: category "permanently allowed", category "allowed in the medium-term", category "allowed in the short-term" and category "not allowed".

In an alternative embodiment relating to the four categories, a number of points, in particular a continuous number of points, can also be provided to classify the spindle status. If the number of points is selected between zero and one, for instance, the load of the spindle can therefore be reproduced from "permanently allowed", characterized with zero, as far as "not allowed", characterized with one. Naturally a different type of nomenclature is likewise conceivable.

The detecting means preferably senses the sensor data for a defined time window. The time window advantageously amounts to between 0.5 seconds and ten seconds, in particular between one second and five seconds.

The processing unit preferably ascertains the determined spindle status by means of an ensemble of at least ten decision trees comprising the sensor data and stored in the processing unit. An ensemble of regularized decision trees is advantageously stored in the processing unit. In a preferred embodiment of the invention, this is carried out by the processing unit using artificial intelligence to calculate at least one defined feature of the sensor data on the basis of the defined time window and on the basis of the detected sensor data.

A number of defined features are preferably calculated for each signal, which is detected by a sensor, for a time window which is predetermined preferably at the factory or also by a customer and is subsequently no longer changeable.

The defined features are for instance a mean value of the sensor data and/or coefficients of a continuous wavelet transformation, for instance together with statistical features such as e.g. statistical torques and/or an absolute sum of changes within a time window. This results in a good time-frequency display of the signals. Artificial intelligence and the ensemble of regularized decision trees already mentioned are used by the processing unit to ascertain the determined spindle status on the basis of the defined features. Since the determined spindle status in accordance with the invention characterizes the load of the spindle, the processing unit can be used to categorize the load of the spindle.

Advantageously in order to determine the spindle status the artificial intelligence, in particular in the form of a module for artificial intelligence, is trained on the basis of characterized sensor data. The sensor data can be obtained by compiling controlled experiences with known loads of the spindle. In this way it is possible to cover a large scope of typical types of operation, operating modes and tools.

During a training of this type, gradient boosting can also be applied in order to adjust parameters, which the artificial intelligence uses in order to estimate the spindle status.

The known load of the spindle is advantageously determined for training purposes on the basis of a customer-specific mechanistic model. By means of this training the artificial intelligence learns to predict the load of the spindle on the basis of the detected sensor data in various modes of operation.

For training purposes, as an alternative to the mechanistic model domain expertise can also be used. In this regard an expert labels or marks the sensor data by hand. An expert knows from experience when the load of the spindle reaches a maximum, so that a labeling of this type is possible.

In an advantageous embodiment of the invention, the analysis of the detected sensor data is carried out using artificial intelligence by means of a convolutional neural network, also referred to as CNN. For this purpose sensor data is preferably evaluated within a time window.

The CNN uses unprocessed signals as input values, also referred to as raw signals, in accordance with a trivial standardization, for instance by means of min-max scaling or Z-score standardization. In this way standardized data is channeled through a network of weighted nonlinear or linear functions. Values thus obtained are output by means of the output means and indicate the current load of the spindle.

A convolutional layer is moreover preferably used, which comprises a series of local filters. In this regard significant features are extracted from the signals automatically.

A fully-connected layer connects flattened filters to a specific number of output nodes. The number of nodes preferably corresponds to the categories of the load of the spindle. Each node preferably corresponds to one of the categories already mentioned previously "permanently allowed", "allowed in the medium-term", "allowed in the short-term" and "not allowed". A final load level is identified, by the node which is associated with the largest value being selected.

Weightings of the linear and non-linear functions of the CNN are trained by continuous examples of the sensor data with a known load type. Generated output values are compared with a ground truth.

Advantageously the output means is embodied so as to pass the determined spindle status to a visualization means. The visualization means can be an already existing component (e.g. HMI) of the machine tool or be embodied as a separate visualization means.

A display is particularly well-suited as a visualization means. This display can be part of an HMI system. Here HMI stands for human-machine interface. An HMI system represents a user interface, by means of which a human can come into contact with a machine.

The load level of the spindle is advantageously transferred from the output means to the visualization means during the defined time window. The visualization means can represent the load level in the form of a traffic light, for instance, which comprises the already mentioned four categories, for instance.

Moreover, a display with a number of points or a continuous course, preferably between two numbers of points, or another type of display is also possible.

An ability of the artificial intelligence to generalize depends on a number and variation of the modes of operation with which it has been trained. For training purposes a data record is advantageously divided into a training data record and a validation data record. The artificial intelligence is optimized on the basis of the training data record. On the basis of the validation data record, which is not used during the training, the artificial intelligence and the inventive device are tested. After terminating training, if an error is reduced to a minimum, all parameters are stored. The device can now be used with new data.

The inventive device is particularly suited to a machine tool with a spindle. The machine tool moreover advantageously has at least one sensor, which is used to sense spindle data. The sensor is advantageously connected to the detecting means of the inventive device. A visualization means which is part of the machine tool or is connected to the machine tool as an external device is moreover suited to displaying output values. The determined spindle status can be output hereby.

The invention moreover relates to a method for determining a spindle status with the already mentioned device. In this regard, the sensor data of the spindle is detected by the detecting means, the detected sensor data is analyzed by the processing unit by means of artificial intelligence, the spindle status is determined on the basis of the analysis of the detected sensor data and the determined spindle status is output by the output means.

In an advantageous embodiment of the invention, the load of the spindle is categorized by the processing unit.

In an advantageous embodiment of the invention, the sensor data is detected by the detecting means for a defined time window.

In an advantageous embodiment of the invention, the determined spindle status is ascertained by the processing unit by means of the ensemble of at least ten decision trees comprising the sensor data and stored in the processing unit.

In an advantageous embodiment of the invention, at least one defined feature of the sensor data is calculated by means of the defined time window. A number of defined features are preferably calculated.

In an advantageous embodiment of the invention, the determined spindle status is ascertained by the processing unit by means of the ensemble of at least ten decision trees comprising the defined feature. The determined spindle status is preferably ascertained by the processing unit by means of the ensemble of at least ten decision trees comprising a number of defined features of the sensor data.

In an advantageous embodiment of the invention, the detected sensor data is analyzed by means of artificial intelligence by means of the convolutional neural network.

In an advantageous embodiment of the invention, the determined spindle status is transferred from the output means to a visualization means.

An advantage achieved with the invention consists in a quantitative calculation and display of the current load of the spindle, preferably virtually in real time, being enabled. Since a processing in the processing unit is data-driven, the processing can be improved by means of additional data (e.g. sensor data and/or parameter data of the spindle).

The device uses artificial intelligence to obtain a current data-driven load which is close to a realtime estimation, to which a spindle is exposed during operation.

BRIEF DESCRIPTION OF THE DRAWING

The invention is described in more detail below on the basis of the exemplary embodiments described in the figures. In the drawings.

DETAILED DESCRIPTION OF PREFERRED EMBODIMENTS

Figure 1:
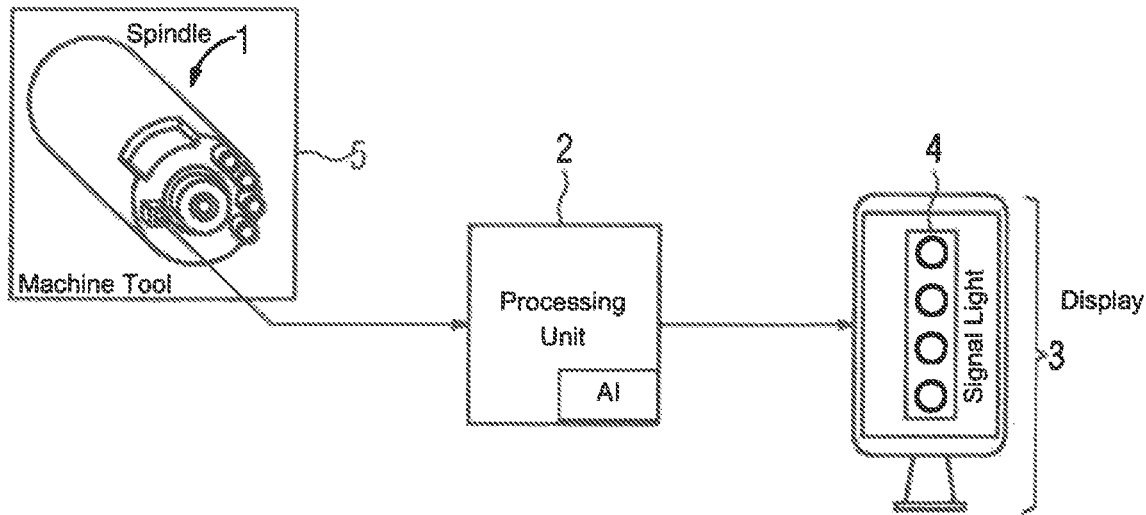
FIG. 1 shows an embodiment of a system comprising a spindle, a device and a visualization means.

FIG. 1 shows an embodiment of a system comprising a spindle 1 of a machine tool 5, a device 2 and a visualization means 3. Sensor data of the spindle 1 is detected by the detecting means of the device 2 and analyzed in the processing facility of the device 2 by means of artificial intelligence. The processing facility determines the spindle status from the analysis. The output means of the device 2 transfers the determined spindle status to a visualization means 3. The visualization means 3 is configured as a display. The traffic light 4 on the visualization means 3 allows four categories to be displayed "permanently allowed", "allowed in the medium-term", allowed in the short-term and "not allowed".

Figure 2:
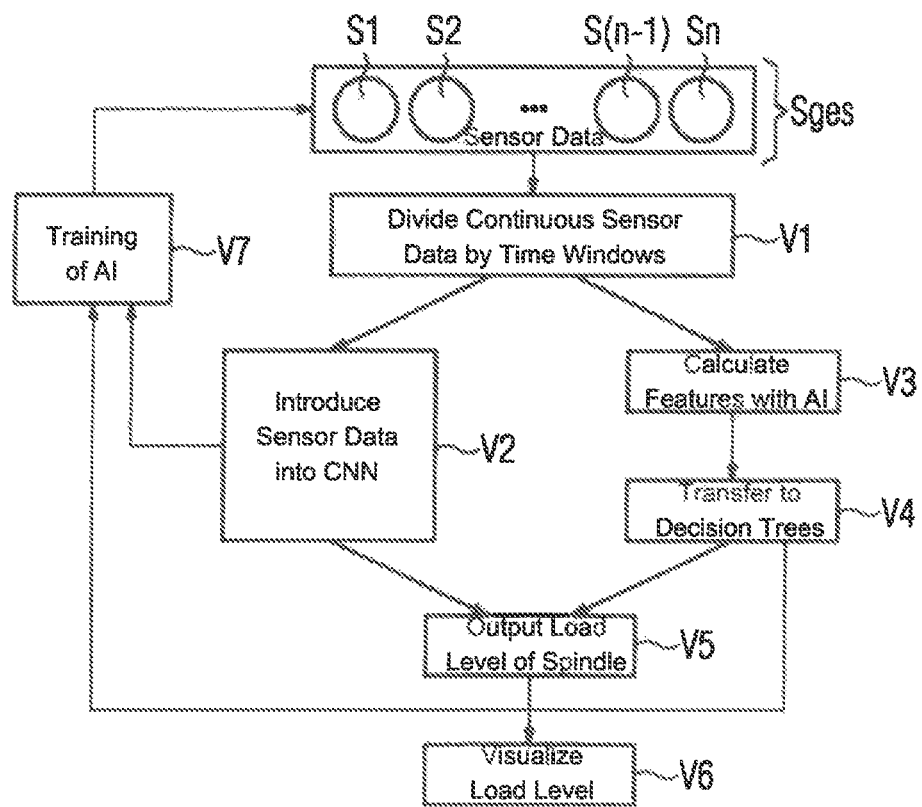
FIG. 2 shows a course of the method.

FIG. 2 shows a course of the method. Firstly signals Sges are detected by sensors. As examples of this, the temperature of the spindle S1, the torque of the spindle S2, the force of the spindle S(n−1) and the speed of rotation of the spindle Sn can be detected. A larger number of signals is also possible, however.

A method step V1 relates to the time window already mentioned. Continuous sensor data is divided by means of time windows of a specific length—preferably between 0.5 seconds and 10 seconds.

In a method step V2, the detected sensor data is introduced as raw signals into a CNN, which is stored in the processing unit comprising artificial intelligence.

Alternatively, in a method step V3, a number of defined features for each signal, which is detected by a sensor, is calculated in the processing unit by means of artificial intelligence for a time window which is predetermined preferably at the factory or also by a customer and is subsequently no longer changeable and in a method step V4 these are transferred to an ensemble of regularized decision trees or boosted classification trees.

In a method step V5, the load level of the spindle is preferably output by means of the output means which is available in the inventive device.

In a method step V6, the load of the spindle is visualized, preferably categorized, by means of a display.

A method step V7 shows the already explained training of the artificial intelligence by means of recorded sensor data and a known load of the spindle.

The method indicates that a path which is based on a feature-based approximation and a path which is based on neural networks are implemented in the device respectively. The path via the CNN is mainly based on raw signals and can be extended or improved easily, by new data being inserted.

The invention claimed is:

1. A device for determining a spindle status of a spindle of a machine tool, said device comprising:
   a detector detecting continuous sensor data of the spindle;
   a processing unit configured to analyze the detected sensor data through artificial intelligence by
      dividing the continuous sensor data into a plurality of time windows having each a predetermined duration to obtain for each of the plurality of time windows a signal associated with the time window,
      analyzing, with a second AI-module based on a CNN (convolutional neural network), raw continuous sensor data to determine a first value representative of a load of the spindle,
      analyzing, with a second AI-module based on an ensemble of regularized decision trees or boosted classification trees, characterized sensor data a second value representative the load of the spindle for the time window,
      calculating with the second AI-module for each signal defined features and transferring the defined features to the ensemble of regularized decision trees or boosted classification trees to determine a second value representative of the load of the spindle,
      based on the first value and on the second value, determining with the processing unit a category of the load of the spindle;
      determining the spindle status based on the category of the load of the spindle for each of the plurality of signals, and
   an output member outputting the determined spindle status.

2. The device of claim 1, wherein the determined spindle status characterizes the load of the spindle.

3. The device of claim 2, wherein the processing unit is configured to categorize the load of the spindle.

4. The device of claim 1, wherein the defined feature represents an average value of the sensor data or coefficients of a continuous wavelet transformation, or both.

5. The device of claim 1, wherein the defined feature represents an average value of the sensor data or coefficients of a continuous wavelet transformation together with a statistical feature, or both.

6. The device of claim 5, wherein the statistical feature is a statistical torque or an absolute sum of changes within the defined time window, or both.

7. The device of claim 1, wherein the processing unit has stored therein an ensemble of at least ten decision trees comprising the sensor data, said processing unit being configured to ascertain the determined spindle status on the basis of the ensemble of the at least ten decision trees.

8. The device of claim 1, the processing unit determines a data-driven bad which approximates a real-time estimation and to which a spindle is exposed during operation.

9. The device of claim 1, wherein the processing unit analyzes the sensor data by using a convolutional neural network.

10. The device of claim 1, further comprising a display, said output device being configured to transfer the determined spindle status to the display.

11. A machine tool, comprising:
    a spindle; and
    a device for determining a spindle status of the spindle, said device including a detector detecting continuous sensor data of the spindle, a processing unit configured to analyze the detected sensor data through artificial intelligence by
       dividing the continuous sensor data into a plurality of time windows having each a predetermined duration to obtain for each of the plurality of time windows a signal associated with the time window,
       analyzing, with a first AI-module based on a CNN (convolutional neural network), raw continuous sensor data to determine a first value representative of a load of the spindle,
       analyzing, with a second AI-module based on an ensemble of regularized decision trees or boosted classification trees, characterized sensor data a second value representative of the load of the spindle for the time window,
       calculating with the second AI-module for each signal defined features and transferring the defined features to the ensemble of regularized decision trees or boosted classification trees to determine a second value representative of the load of the spindle,
       based on the first value and on the second value, determining with the processing unit a category of the load of the spindle;
       determining the spindle status based on the category of the load of the spindle for each of the plurality of signals, and an output member outputting the determined spindle status.

12. The machine tool of claim 11, further comprising a display connected to the output member for visualizing the determined spindle status.

13. A method for determining a spindle status of a spindle of a machine tool, comprising:
- detecting with a detector continuous sensor data of the spindle;
- analyzing the detected sensor data with a processing unit using artificial intelligence (AI), by:
  - dividing the continuous sensor data into a plurality of time windows having each a predetermined duration to obtain for each of the plurality of time windows a signal associated with the time window,
  - analyzing, with a first AI-module based on CNN (convolutional neural network), raw continuous sensor data to determine a first value representative of a load of the spindle,
  - analyzing, with a second AI-module based on an ensemble of regularized decision trees or boosted classification trees, characterized sensor data a second value representative of the load of the spindle for the time window,
  - calculating with the second AI-module for each signal defined features and transferring the defined features to the ensemble of regularized decision trees or boosted classification trees to determine a second value representative of the load of the spindle,
  - based on the first value and, on the second value, determining with the processing unit a category of the load of the spindle;
- determining the spindle status based on the category of the load of the spindle for each of the plurality of signals; and
- outputting the determined spindle status.

14. The method of claim 13, further comprising:
- storing in the processing unit an ensemble of at least ten decision trees comprising the sensor data; and
- ascertaining the determined spindle status with the processing unit on the basis of the ensemble of at least ten decision trees.

* * * * *